3,420,811
SOLUBLE EDIBLE SODIUM CASEINATES PREPARED BY OXIDIZING CASEIN DISPERSIONS WITH $H_2O_2$ OR $Cl_2$ AND THEN SOLUBILIZING THE RESULTANT PRODUCTS WITH A FOOD GRADE SODIUM COMPOUND
Wilhelmine H. Van Wieren and George A. Damisch, Syracuse, N.Y., assignors to The Borden Company, New York, N.Y., a corporation of New Jersey
No Drawing. Filed Aug. 6, 1965, Ser. No. 477,938
U.S. Cl. 260—119                                    4 Claims
Int. Cl. A23j 3/00; C07g 7/00

ABSTRACT OF THE DISCLOSURE

This invention relates to the method of preparing sodium caseinate and to the resultant products having improved flavor and storage stability comprising the steps of treating an aqueous dispersion of an edible casein with a reagent selected from the group consisting of an aqeous solution of chlorine, hydrogen peroxide, and combinations thereof, and then solubilizing the casein with a food grade sodium compound, the proportions of reagent being, for each part by weight of casein, from about 5 to about 25 parts by weight of about 5 to about 40 p.p.m. chlorine solution and from about 3 to about 25 parts by weight of about 5 to about 70 p.p.m. hydrogen peroxide solution.

---

This invention relates to casein and in particular to the preparation of sodium caseinate having improved flavor and storage stability.

Casein, in particular, sodium caseinate, is used as a source of protein in a variety of food products such as diary and bakery products. Its use heretofore has been restricted because of its characteristic flavor and because it ages and stales very rapidly forming objectionable flavors and odors further limiting its use in food products. It has long been desired to produce a sodium caseinate of improved flavor and further one which would be storage stable so as not to develop objectionable flavors and odors under storage conditions. In addition it would be desirable to be able to reprocess conventionally prepared sodium caseinate in such a manner as to improve its flavor and storage stability.

The present invention provides a storage stable sodium caseinate by treatment of casein prior to precipitation with a sodium salt or by reprocessing sodium caseinate.

Briefly stated, the present invention comprises the method of preparing sodium caseinate by treating an aqueous dispersion of casein with a reagent from the group consisting of chlorine, hydrogen peroxide, and combinations thereof, and to the resultant product.

As to materials, any casein of food grade may be used, such as the acid precipitated type or that produced by the rennet process. The casein may be freshly precipitated or dehydrated. In addition, the casein may be obtained by reprecipitation from conventionally prepared sodium caseinate.

As to the reagent used, chlorine alone, hydrogen peroxide alone, or a combination of both can be used; the use of chlorine alone being preferred. The chlorine is preferably supplied in the form of an aqueous solution. Sodium hypochlorite, chlorine gas, calcium hypochlorite, sodium para-toluene sulfonchloroamine, and mixtures thereof can be used to prepare solutions containing the requisite concentration of chlorine. Alternatively, these same compounds can be added directly to the wash water used to treat the casein as hereinafter described. The source of hydrogen peroxide is preferably a commercial hydrogen peroxide solution.

As to proportions, a solution of from about 5 to about 40 p.p.m. of chlorine should be used in a ratio of about 5 to about 25 parts by weight solution to 1 part by weight of casein. Levels much above 40 p.p.m., i.e., above 50 p.p.m. tend to give an undesirable flavor to the product. An aqueous solution of about 5 to 70 p.p.m. of hydrogen peroxide should be used in a ratio of about 3 to about 25 parts by weight of solution to 1 part by weight of casein.

In general, the processing of the casein according to the present invention comprises first washing the casein with water at a temperature of 80 to 85° F. as is conventional in the processing of casein. In accordance with the present invention, however, a compound capable of releasing chlorine is added to this wash water in the proportions noted above. The ratio of water to casein is about 10 to 1 and the mixture is agitated for about 1 hour. After the casein has been drained it is then washed twice with water at 65–75° F. in the ratio of about 6 parts of water to 1 of casein and agitated during washing for about five minutes in order to insure that all of the lactalbumin, salts, and other impurities are removed. In an alternate embodiment of the process after the third wash water is removed, additional water at 65°–70° F. and containing hydrogen peroxide is added. Additional water at 70°–160° F. is then added to give approximately 9% to 12% total solids. This water also contains sufficient food grade sodium compound, such as sodium hydroxide or sodium bicarbonate, to bring the pH of an approximately 12% solution to 6.1–6.7. This mixture is agitated for 5 to 20 minutes, and then heated and the resultant sodium caseinate aqueous solution formed used as such or cooled and dried.

The ratio of water to casein in the washes may range from 5 to 20 parts by weight of water to 1 part by weight of casein and the period of agitation can range from 30 minutes to 3 hours for the first wash and 5 to 30 minutes for the second and third wash. The water temperature may range from about 60° to 90° F. for all washes.

For treatment with hydrogen peroxide the water temperature may range from about 65° to 160° F. The total solids of the sodium casein solution can range from about 3% to about 13% and the pH range may vary from about 6.1 to 7.2.

In alternate variations of the method the hydrogen peroxide addition to the wash water may be eliminated and only the initial chlorine wash used or the initial chlorine wash omitted and just the hydrogen peroxide treatment used. All three procedures are suitable with the chlorine treatment above being preferred.

The invention will be further illustrated by description in connection with the following specific examples of the practice of it. In these examples and elsewhere herein proportions are expressed as parts by weight except when specifically stated to the contrary.

Example 1

195 pounds of water at 84° F. and containing 22 p.p.m. of chlorine from sodium hypochlorite was admixed with 20 pounds of New Zealand casein and agitated for one hour. Agitation was then stopped, the mixture allowed to settle 5 minutes and drained through an 80 mesh screen.

122.5 pounds of water at 78° F. was added to the casein, the mixture agitated for 5 minutes, allowed to settle for 5 minutes and drained through an 80 mesh screen. The second washing step was then repeated.

70 pounds of water at 75° F. with 290 grams of sodium bicarbonate was added to the washed casein and agitated to insure a thorough admixture. The mixture was slowly heated to 150° F. and 7.5 pounds of water with 31.07 grams of sodium bicarbonate added. After further heating to 175° F., 2.5 pounds of water with 10.36 grams of sodium bicarbonate was added and the mixture heated to 200° F. where it was held for 3 minutes before cooling. The total solids of the solution was 12.27% and the pH 6.4.

The resultant product did not develop the usual sodium caseinate flavor either initially nor after prolonged storage.

Example 2

The procedure of Example 1 was carried out except that 225 pounds of water containing 14.37 p.p.m. of chlorine from sodium hypochlorite was admixed with 15 pounds of New Zealand casein. The resultant product had the improved flavor and storage stability of the product of Example 1.

Example 3

The procedure of Example 1 was carried out except that no chlorine was added in the first wash water.

After the third washing step, 50 pounds of water with 33.1 ml. of 3% hydrogen peroxide was added to the drained casein. After agitation for 5 minutes, 10 pounds of water with 160 grams of sodium bicarbonate was added and the mixture heated. 4 pounds of water with 80 grams of sodium bicarbonate was added at 163° F., 3 pounds of water with 40 grams of sodium bicarbonate at 171° F. and an additional 3 pounds of water with 40 grams of sodium bicarbonate at 178° F. At this point no hydrogen peroxide was detected in the solution. The mixture was heated to 200° F. and held for 3 minutes. The total solids of the solution was 12.41% and the pH 6.28.

The resultant sodium caseinate had improved flavor and storage stability.

Example 4

The procedure of Example 3 was carried out with the addition of chlorine to the first wash water as in Example 1. Equally good results were obtained.

Example 5

The procedure of Example 4 was carried out except that sodium hydroxide was used in place of sodium bicarbonate. Equally good results were obtained.

Example 6

195 pounds of water at 84° F. and containing 39.9 ml. of sodium hypochlorite was admixed with 20 lbs. of New Zealand casein and agitated for one hour. Agitation was then stopped, the mixture allowed to settle 5 minutes, and drained through an 80 mesh screen.

122.5 pounds of water at 73° F. was added to the casein, the mixture agitated for 5 minutes, allowed to settle for 5 minutes and drained through an 80 mesh screen. The second washing step was repeated except that the mixture was agitated for 7 minutes.

70 pounds of water with 33.11 ml. of 3% $H_2O_2$ was added to the casein and agitated for several minutes to insure a thorough admixture. 10 pounds of water at 70° F. and containing 375 ml. of 40% NaOH (U.S.P.) was then added and the entire mixture agitated. After addition of all the NaOH the mixture was slowly heated to 180° F. to solubilize the casein.

The sodium caseinate solution was then cooled to 76° F. and spray dried. The total solids of the solution prior to drying was 12.76%.

The resultant product did not develop the typical sodium caseinate off-flavors during storage.

Example 7

In modification of Example 4, the sodium hypochlorite is replaced in turn by an equivalent amount of calcium hypochlorite, chlorine gas and sodium para-toluene sulfonchloramine. In each instant equivalent results are obtained.

Example 8

18 grams of commercial sodium caseinate was dissolved in 300 ml. of water with heat, and cooled to 90°–105° F. 814 ml. of hydrochloric acid was added to give a pH of 4.2. The precipitated casein was washed once with water and mixed in a Waring Blender with a small amount of water. The mixture was drained and the casein washed several times with water.

The casein was then mixed with 500 ml. of water containing 146 ml. of a 1:10 sodium hypochlorite solution at room temperature. After approximately 40 minutes the mixture was drained and 100 ml. of water containing 10 grams of sodium bicarbonate added to the mixture. The mixture was heated to resolubilize the casein and cooled. The resulting solution had a much improved flavor over that of a solution of the original untreated sodium caseinate.

Tests made during the treatment of the casein could not detect any chlorine or $H_2O_2$ after heating to solubilize the casein.

It will be understood that it is intended to cover all changes and modifications of the examples of the invention herein chosen for the purpose of illustration which do not constitute departures from the spirit and scope of the invention.

What is claimed is:

1. The method of preparing soluble edible sodium caseinate of improved flavor and storage stability comprising the steps of treating a water dispersion of an edible casein with an aqueous solution of chlorine or an aqueous solution of hydrogen peroxide, and then reacting the casein with a food grade sodium compound to render the final product sodium caseinate, water soluble, the proportions of reagent being, for each part by weight of casein, from about 5 to about 25 parts by weight of about 5 to about 40 p.p.m. chlorine solution and from about 3 to about 25 parts by weight of about 5 to about 70 p.p.m. hydrogen peroxide solution.

2. The method according to claim 1, wherein the reagent is an aqueous solution of chlorine 3. The method according to claim 1, wherein the reagent is an aqueous solution of hydrogen peroxide.

4. The method of preparing soluble edible sodium caseinate of improved flavor and storage stability comprising the steps of treating a water dispersion of casein with from about 5 to about 25 parts by weight, for each part by weight of casein, of an aqueous chlorine solution containing from about 5 to about 40 p.p.m. $Cl_2$, then treating the thus treated casein with about 3 to about 25 parts by weight, for each part by weight of casein, of an aqueous solution of hydrogen peroxide containing about 5 to about 70 p.p.m. $H_2O_2$, and then reacting the casein with a food grade sodium compound to render the final product sodium caseinate, water soluble.

References Cited

UNITED STATES PATENTS

| | | | |
|---|---|---|---|
| 967,584 | 8/1910 | Tambach | 260—119 |
| 1,037,685 | 9/1912 | Tambach | 260—119 |
| 2,691,582 | 10/1954 | Lowe et al. | 95—7 |
| 2,713,575 | 7/1955 | Gates et al. | 260—117 |
| 2,744,891 | 5/1956 | Waugh | 260—120 |
| 2,757,171 | 7/1956 | Mozingo et al. | 260—119 |
| 1,505,551 | 8/1924 | Funk et al. | |

(Other references on following page)

OTHER REFERENCES

Sutermeister et al.: Casein and its Industrial Applications, 1939, pp. 18–19, 24–29, 72–73, 77–78 and 95–96.

Chemical Abstracts, vol. 46, 543 c–d. Fernandez, 1952.

Encyclopedia of Polymer Science and Technology, vol. 2, Mark et al., 1965, pp. 861–866 (Publication Date May 25, 1965).

Encyclopedia of Chemical Technology, vol. 3, 1949, Kirk-Othmer, pp. 225–226 and 231.

Sutermeister: Casein and its Industrial Applications, pp. 51–52.

WILLIAM H. SHORT, *Primary Examiner*.

HOWARD SCHAIN, *Assistant Examiner*.

U.S. Cl. X.R.

99—20; 260—120